United States Patent
Kaikkonen et al.

(10) Patent No.: US 9,609,683 B2
(45) Date of Patent: Mar. 28, 2017

(54) METHOD AND APPARATUS FOR IMPROVED MULTI SUBSCRIPTION OPERATION

(75) Inventors: Jorma Johannes Kaikkonen, Oulu (FI); Jussi-Pekka Koskinen, Oulu (FI); Jarkko Tuomo Koskela, Oulu (FI); Petri Juhani Vasenkari, Turku (FI); Hannu Ilmari Pirila, Espoo (FI); Sari Kaarina Nielsen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/377,031

(22) PCT Filed: Feb. 23, 2012

(86) PCT No.: PCT/IB2012/050819
§ 371 (c)(1),
(2), (4) Date: Aug. 6, 2014

(87) PCT Pub. No.: WO2013/124709
PCT Pub. Date: Aug. 29, 2013

(65) Prior Publication Data
US 2015/0056998 A1 Feb. 26, 2015

(51) Int. Cl.
*H04W 76/02* (2009.01)
*H04W 36/30* (2009.01)
*H04W 88/06* (2009.01)

(52) U.S. Cl.
CPC ......... *H04W 76/028* (2013.01); *H04W 36/30* (2013.01); *H04W 88/06* (2013.01)

(58) Field of Classification Search
CPC ... H04W 36/30; H04W 76/028; H04W 88/06; H04W 36/14; H04W 60/005;
(Continued)

(56) References Cited

U.S. PATENT DOCUMENTS

| 2003/0152044 A1* | 8/2003 | Turner | H04W 68/12 370/328 |
| 2005/0075106 A1* | 4/2005 | Jiang | H04M 3/42263 455/432.3 |

(Continued)

FOREIGN PATENT DOCUMENTS

| WO | 9941921 | 8/1999 |
| WO | 2012103034 | 8/2012 |

OTHER PUBLICATIONS

International Search Report and Written Opinion received for corresponding Patent Cooperation Treaty Application No. PCT/IB2012/050819 , dated Jan. 6, 2013, 13 pages.
(Continued)

*Primary Examiner* — Hirdepal Singh
(74) *Attorney, Agent, or Firm* — Mintz Levin Cohn Ferris Glovsky and Popeo, P.C.

(57) ABSTRACT

A method, apparatus and computer program product are provided in which the network is informed of a connection break with a device having multiple SIMs. In this regard, from the perspective of the device, information regarding a connection break with the device is provided to a network entity associated with a first network, the device communicating with the first network via a first subscription. The method may also cause the connection break to be initiated and causing another connection to be established with the device via a second subscription. From the perspective of the network, a method, apparatus and computer program product are provided in which the network receives information regarding the connection break and, based on the information, performs one or more network optimization actions.

21 Claims, 5 Drawing Sheets

(58) Field of Classification Search
CPC ............. H04W 36/18; H04W 52/0241; H04W 52/0254; H04W 36/20; H04W 48/16; H04W 48/18; H04W 76/02; H04W 84/12
See application file for complete search history.

(56) References Cited

U.S. PATENT DOCUMENTS

| | | | |
|---|---|---|---|
| 2009/0215472 A1 | 8/2009 | Hsu | |
| 2010/0329205 A1* | 12/2010 | Bi | H04W 48/04 370/331 |
| 2011/0077003 A1 | 3/2011 | Shin | |
| 2011/0195749 A1 | 8/2011 | Lan | |
| 2011/0217969 A1* | 9/2011 | Spartz | H04W 36/14 455/422.1 |
| 2011/0244880 A1 | 10/2011 | Chin et al. | |
| 2012/0294291 A1 | 11/2012 | Su et al. | |
| 2013/0150014 A1* | 6/2013 | Gong | H04W 8/183 455/418 |
| 2013/0150018 A1* | 6/2013 | Su | H04B 1/0067 455/419 |
| 2013/0183974 A1* | 7/2013 | Johansson | H04W 76/027 455/436 |
| 2013/0189985 A1* | 7/2013 | Mutya | H04W 52/0241 455/436 |
| 2013/0201947 A1* | 8/2013 | Wong | H04W 52/325 370/329 |
| 2013/0210421 A1* | 8/2013 | Mohseni | H04W 60/005 455/423 |
| 2013/0329639 A1* | 12/2013 | Wietfeldt | H04W 88/06 370/328 |
| 2014/0148174 A1* | 5/2014 | Teyeb | H04W 36/0083 455/441 |
| 2015/0031363 A1* | 1/2015 | Kordybach | H04W 36/0094 455/436 |
| 2015/0141006 A1* | 5/2015 | Walke | H04W 8/18 455/434 |

OTHER PUBLICATIONS

"Dual-SIM Dual-Standby UEs and Their Impact on the RAN", 3GPP TSG-RAN WG2 #75bis, R2-115375, Agenda: 04.1, Ericsson, Oct. 10-14, 2011, pp. 1-3.

"3rd Generation Partnership Project; Technical Specification Group Radio Access Network; Radio Resource Control (RRC); Protocol specification (Release 10)", 3GPP TS 25.331, V9.1.0, Dec. 2009, pp. 1-1759.

Ericsson, "Dual-SIM Dual-Standby UEs and their impact on the RAN," 3GPP TSG-RAN WG2, 3GPP Draft; R2-115375, 3 pages (Oct. 3, 2011).

* cited by examiner

METHOD AND APPARATUS FOR IMPROVED MULTI SUBSCRIPTION OPERATION

RELATED APPLICATION

This application was originally filed as PCT Application No. PCT/IB2012/050819 filed Feb. 23, 2012.

TECHNOLOGICAL FIELD

An example embodiment of the present invention relates generally to a device having multiple subscriptions and, more particularly, the communication of information regarding a connection break initiated by the device having multiple subscriptions.

BACKGROUND

There is an increasing demand for devices that can support multiple subscriptions, thereby supporting simultaneous wireless, e.g., cellular, access with different networks, such as different public land mobile networks (PLMNs) and/or networks operated by different carriers and/or different network operators. In order to support multiple subscriptions, devices, such as mobile terminals, may include multiple SIMs. In this regard, devices that include two SIMS are often referred to as dual SIM devices. However, devices may include any number of SIMs for supporting three, four, five or more subscriptions.

Dual SIM devices may permit consumers to reduce their call tariffs. In this regard, by utilizing the SIMs from two different operators on the same dual SIM device, the user is able to select the less expensive network for establishing an active connection. There are two principle types of dual SIM devices, namely, dual SIM dual standby (DSDS) devices and dual SIM dual active (DSDA) devices. DSDA devices may be utilized by users who desire to separate different contact groups. In this regard, a user of a DSDA device may provide one phone number associated with a first SIM to their business contacts and a different phone number associated with a second SIM to their private contacts since a DSDA device is able to receive a call to both SIMs regardless of other active connections.

In contrast to a DSDA device that permits the user to receive a call to both SIMs regardless of other active connections, a DSDS device having multiple subscriptions may allow all subscriptions to be registered to a wireless network, such as a cellular or other radio access network, but only one subscription can set up an active radio link toward the network at a time. In other words, a DSDS device generally has a single radio front end and base band chain. There are various subcategories of DSDS devices depending upon the status of the connection that another subscription can have toward the network while one subscription has an active connection toward the network. These subcategories range from DSDS devices in which a user manually selects the subscription that is to be active and registered to the network to DSDS devices in which the DSDS device interrupts an active packet switched connection, e.g., a data call, of one subscription in order to momentarily listen for pages in accordance with the other subscription.

In order to overcome some of the limitations of DSDS devices that have only a single radio front end and baseband chain, a DSDS device may include multiple, such as two, standalone cellular radios with each SIM connected to a respective cellular radio. In this context, a cellular radio may include the base band chain and the radio frequency hardware, as well as the software that controls the radio frequency hardware.

In an instance in which a DSDS device interrupts an active connection with a first network in order to read paging information from another network or to perform other procedures such as to perform tracking area updates or cell search procedures, a gap may be introduced into the active connection with the first network which may, in turn, negatively impact the communications conducted with the first network. For example, the gap in the reception from the first network may prevent the mobile terminal from promptly acknowledging and/or negatively acknowledging signals received from the first network, thereby preventing network downlink adaptation from functioning properly. Additionally, if the gaps introduced into the reception from the first network prevent the mobile terminal from transmitting signals in the manner requested or allocated by the network, network uplink adaptation may also not function promptly. Additionally, the gaps introduced by the reception from the first network may result in missed paging which may, in turn, cause the network to page the mobile terminal within a larger area, thereby increasing the paging load for several cells. Still further, the gap introduced in the reception from the first network may even cause the connection with the first network to be released.

In the idle state in certain networks, such as a universal mobile telecommunications system (UMTS) terrestrial radio access network (UTRAN) or a global system for mobile communications (GSM)/Edge radio access network (GERAN), a mobile terminal may be allowed to interrupt the paging reception from the serving cell while reading system information for cell-reselection purposes. The carriers and radio access technology which should be evaluated by the mobile terminal for reselection purposes are signaled by the network. As such, an interruption in the paging reception as introduced by a DSDS device in order to read the system information of another network may also violate the current requirement specifications in an instance in which the other network has not been configured by the serving cell.

It may be difficult to predict the manner in which a network will interpret the gaps in reception introduced by a DSDS device in order to read paging occasions or system information of another network. However, a first network may interpret shorter gaps, such as gaps of tens of milliseconds, as a radio problem, while longer gaps may be classified as an error. As a result, the control algorithms, such as the algorithms for link adaptation, power control or the like, that are implemented by the network may be inaccurate. In other instances, there may be radio link failure and the initiation of corresponding recovery mechanisms. The challenges created by the gaps created in the reception from the first network by a DSDS device that reads paging occasions or system information from another network may not only impact the DSDS device, but may also negatively impact other mobile terminals supported by the same cell since the cell may experience decreased performance as a result of the network resources being consumed by the DSDS device. Additionally, the adaptation algorithms that are intended to optimize the network performance may also be inaccurate as a result of the gaps introduced to the reception from the first network by the DSDS device which may impact network performance and, in turn, the performance of other mobile terminals.

Multi-SIM devices may switch connections from network to network to use services more frequently than ordinary devices. Thus, there may be more connections breaks caused by multi-SIM devices and this type of use may cause inefficiencies in the network.

BRIEF SUMMARY

A method, apparatus and computer program product are provided according to one embodiment of the present invention in which the network is informed of a connection break initiated by a device having multiple subscriptions. In one embodiment, the method, apparatus and computer program product may inform the network of an impending connection break, while in another embodiment, the method, apparatus and computer program product may inform the network about a connection break that has already occurred. By informing the network of a connection break, the network may account for the connection breaks and therefore the mobile terminal having multiple subscriptions and the network may communicate in an improved fashion as well as in a manner that reduces the impact upon the network and other mobile terminals.

In one embodiment, a method is provided that includes causing information regarding a connection break in an ongoing connection between a mobile terminal and a first network to be provided to a network entity associated with the first network, the mobile terminal being associated with a plurality of subscriptions and communicating with the first network via a first subscription of the plurality of subscriptions. The method of this embodiment also causes the connection break in the ongoing connection to be initiated. In this embodiment, the method also causes another connection to be established by the mobile terminal using a second subscription of the plurality of subscriptions.

In another embodiment, an apparatus is provided that includes at least one processor and at least one memory storing program code instructions with the at least one memory and the computer program code configured to, with the processor, cause the apparatus to cause information regarding a connection break in an ongoing connection between the apparatus and a first network to be provided to a network entity associated with the first network, the apparatus being associated with a plurality of subscriptions and communicating with the first network via a first subscription of the plurality of subscriptions. The at least one memory and the computer program code are also configured to, with the processor, cause the apparatus of this embodiment to cause the connection break in the ongoing connection to be initiated. In this embodiment, the at least one memory and the computer program code are further configured to, with the processor, cause the apparatus to cause another connection to be established using a second subscription of the plurality of subscriptions.

In a further embodiment, a computer program product is provided that includes at least one computer-readable storage medium having computer-executable program code portions stored therein with the computer-executable program code portions being configured to, upon execution, cause an apparatus to cause information regarding a connection break in an ongoing connection between the apparatus and a first network to be provided to a network entity associated with the first network, the apparatus being associated with a plurality of subscriptions and communicating with the first network via a first subscription of the plurality of subscriptions. The computer-executable program code portions of this embodiment are also configured to, upon execution, cause an apparatus to cause the connection break in the ongoing connection to be initiated. In this embodiment, the computer-executable program code portions are also configured to, upon execution, cause the apparatus to cause another connection to be established using a second subscription of the plurality of subscriptions.

In yet another embodiment, an apparatus is provided that includes means for causing information regarding a connection break in an ongoing connection between a mobile terminal and a first network to be provided to a network entity associated with the first network, the mobile terminal being associated with a plurality of subscriptions and communicating with the first network via a first subscription of the plurality of subscriptions. The apparatus of this embodiment also include means for causing the connection break in the ongoing connection to be initiated. In this embodiment, the apparatus also includes means for causing another connection to be established by the mobile terminal using a second subscription of the plurality of subscriptions.

In one embodiment, a method is provided that includes receiving information from a mobile terminal regarding a connection break in an ongoing connection with the mobile terminal, the mobile terminal being associated with a plurality of subscriptions and communicating via a subscription of the plurality of subscriptions. The method of this embodiment also includes performing one or more network optimization actions based on the information.

In another embodiment, an apparatus is provided that includes at least one processor and at least one memory storing program code instructions with the at least one memory and the program code instructions configured to, with the processor, cause the apparatus to includes receive information from a mobile terminal regarding a connection break in an ongoing connection with the mobile terminal, the mobile terminal being associated with a plurality of subscriptions and communicating via a subscription of the plurality of subscriptions. The at least one memory and the program code instructions are also configured to, with the processor, cause the apparatus of this embodiment to perform one or more network optimization actions based on the information.

In a further embodiment, a computer program product is provided that includes at least one computer-readable storage medium having computer-executable program code portions stored therein with the computer-executable program code portions being configured to, upon execution, cause an apparatus to receive information from a mobile terminal regarding a connection break in an ongoing connection with the mobile terminal, the mobile terminal being associated with a plurality of subscriptions and communicating via a subscription of the plurality of subscriptions. The computer-executable program code portions of this embodiment are also configured to, upon execution, cause an apparatus to perform one or more network optimization actions based on the information.

In yet another embodiment, an apparatus is provided that includes means for includes receiving information from a mobile terminal regarding a connection break in an ongoing connection with the mobile terminal, the mobile terminal being associated with a plurality of subscriptions and communicating via a subscription of the plurality of subscriptions. The apparatus of this embodiment also includes means for performing one or more network optimization actions based on the information.

BRIEF DESCRIPTION OF THE DRAWINGS

Having thus described certain example embodiments of the present invention in general terms, reference will here- inafter be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Figure 1:
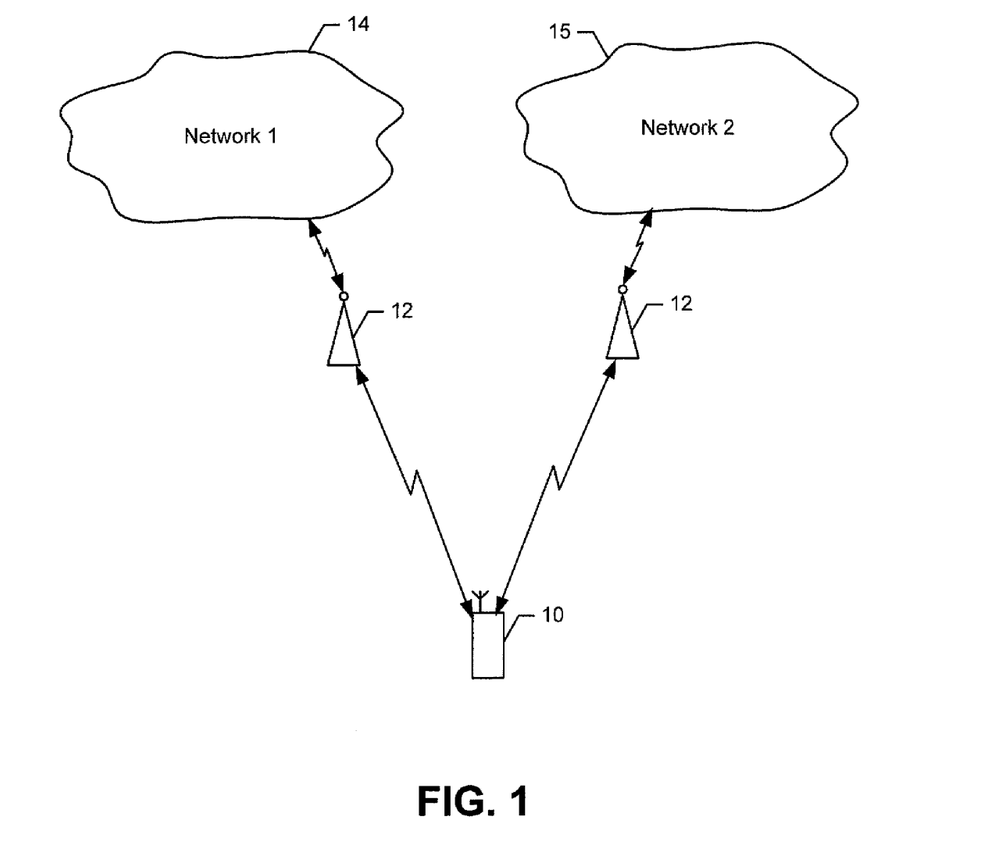
FIG. 1 is a schematic representation of a system in which a mobile terminal associated with multiple subscriptions may communicate with a plurality of networks in accordance with an example embodiment of the present invention.

Referring now to FIG. 1, a system for supporting a mobile terminal 10 having a plurality of subscriptions is illustrated. The mobile terminals may be of various types of mobile communication devices such as, for example, mobile telephones, Personal Digital Assistants (PDAs), pagers, laptop computers, tablet computers, or any of numerous other hand held or portable communication devices, computation devices, content generation devices, content consumption devices, or combinations thereof. The plurality of subscriptions may permit the mobile terminal to communicate via an access point 12, such as an Node B, an evolved Node B (eNB), a base station or the like, with a plurality of networks 12 designated Network 1 and Network 2, for example, in FIG. 1. The mobile terminal may communicate with various types of networks including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, a UTRAN, a GERAN or other type of network.

Figure 2:
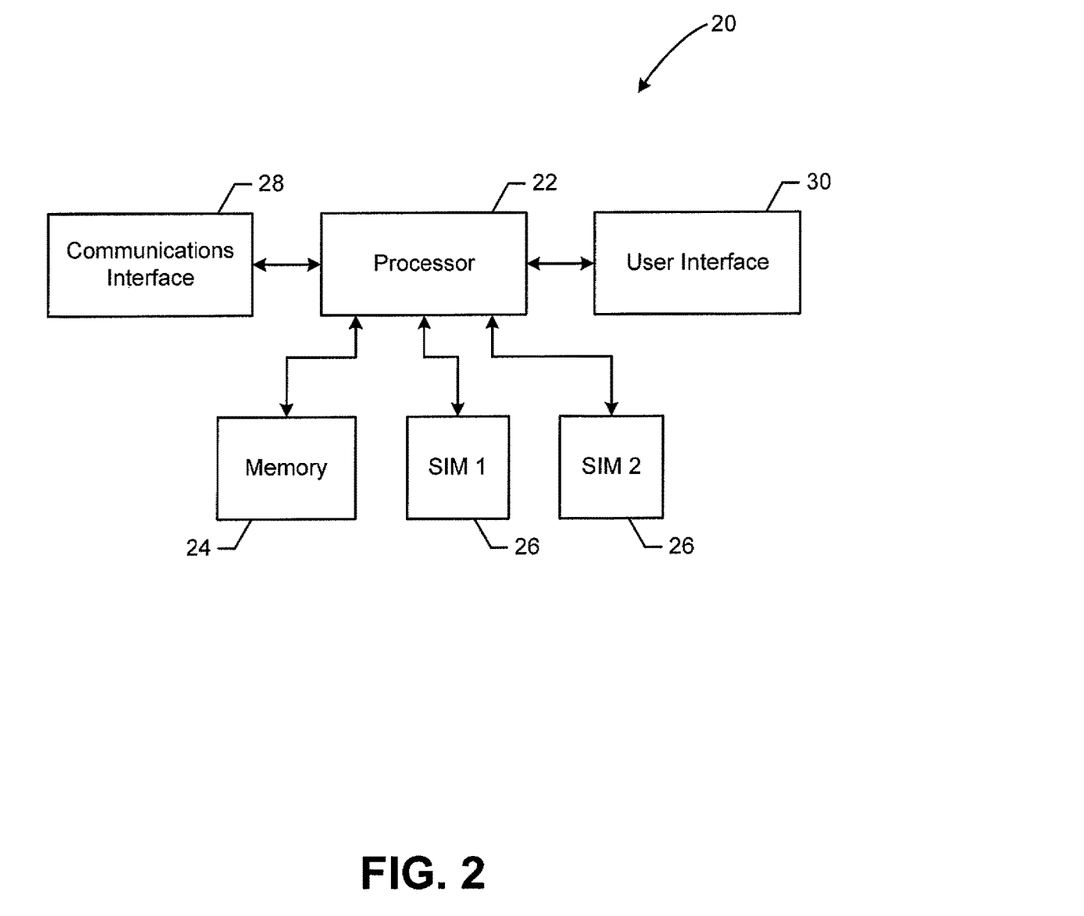
FIG. 2 is a block diagram of an apparatus from the perspective of a mobile terminal that may be specifically configured to perform the operations of an example embodiment of the present invention.

Referring now to FIG. 2, an apparatus 20 that may be embodied by or otherwise associated with a mobile terminal 10 for causing information regarding a break in a connection between the mobile terminal 10 and a first network 14 to be provided to a network entity 12 may include or otherwise be in communication with a processor 22, a memory device 24, a communication interface 28, a user interface 30 and a circuit card or other secure module or other type of secure memory for storing a plurality of SIMs 26. A SIM, such as a code division multiple access (CDMA) SIM (CSIM), a Universal SIM (USIM), an internet protocol (IP) multimedia subsystem (IMS) SIM (ISIMs), a removable user identify module (RUIM) or the like, may store the network access application (NAA) that includes the cryptographic credentials that allows use of at least some of the services of a communication service provider. The NAA may be stored on a removable module or a non-removable module, e.g., a surface mounted or embedded chip.

In some example embodiments, the processor 22 (and/or co-processors or any other processing circuitry assisting or otherwise associated with the processor) may be in communication with the memory device 24 via a bus for passing information among components of the apparatus 20. The memory device may include, for example, one or more non-transitory volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied by a mobile terminal 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network 12 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a DSDA device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 10, the apparatus may include a user interface 28 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

Further, the circuit card or other secure module or other type of secure memory may be configured to store one or more SIMs 26, as described below. The SIMs may be software SIMs of various types including, for example, CSIMs, USIMs, RUIMs and ISIMs. In one example embodiment, the circuit card is embodied by a universal integrated circuit card (UICC), an embedded UICC (eUICC) or the like in order to store the SIMs to facilitate identification and authentication of the user of the mobile terminal 10. In this regard, a SIM may include a unique serial number (ICCID) or other permanent identifier, an international mobile subscriber identity (IMSI), security authentication and ciphering information, temporary information related to the local network, a list of the services to which the user has access and/or passwords.

The apparatus 20 may be associated with, e.g., support, a plurality of subscriptions. The plurality of subscriptions may, for example, be associated with the apparatus by including a plurality of SIMs 26 in the apparatus, each of which supports one or more of the subscriptions maintained by the apparatus. In another embodiment, the plurality of subscriptions may, for example, be associated with the apparatus by including a single SIM 26 in the apparatus which supports a plurality of subscriptions. In yet another embodiment, some other means besides a SIM 26 may be utilized to associate the apparatus with one or more subscriptions. In the illustrated embodiment, the apparatus includes a pair of SIMs, designated SIM 1 and SIM 2, such that the apparatus may be embodied by a dual SIM device, such as a DSDA or a DSDA, and thus be associated with two subscriptions. However, the apparatus may include three or more SIMs, such that the apparatus is embodied by a multi-SIM, multi-subscription device. Additionally, as mentioned above, the apparatus may include a single SIM supporting two, tree, or more subscriptions, such that the apparatus is embodied by a single-SIM, multi-subscription device.

Figure 3:
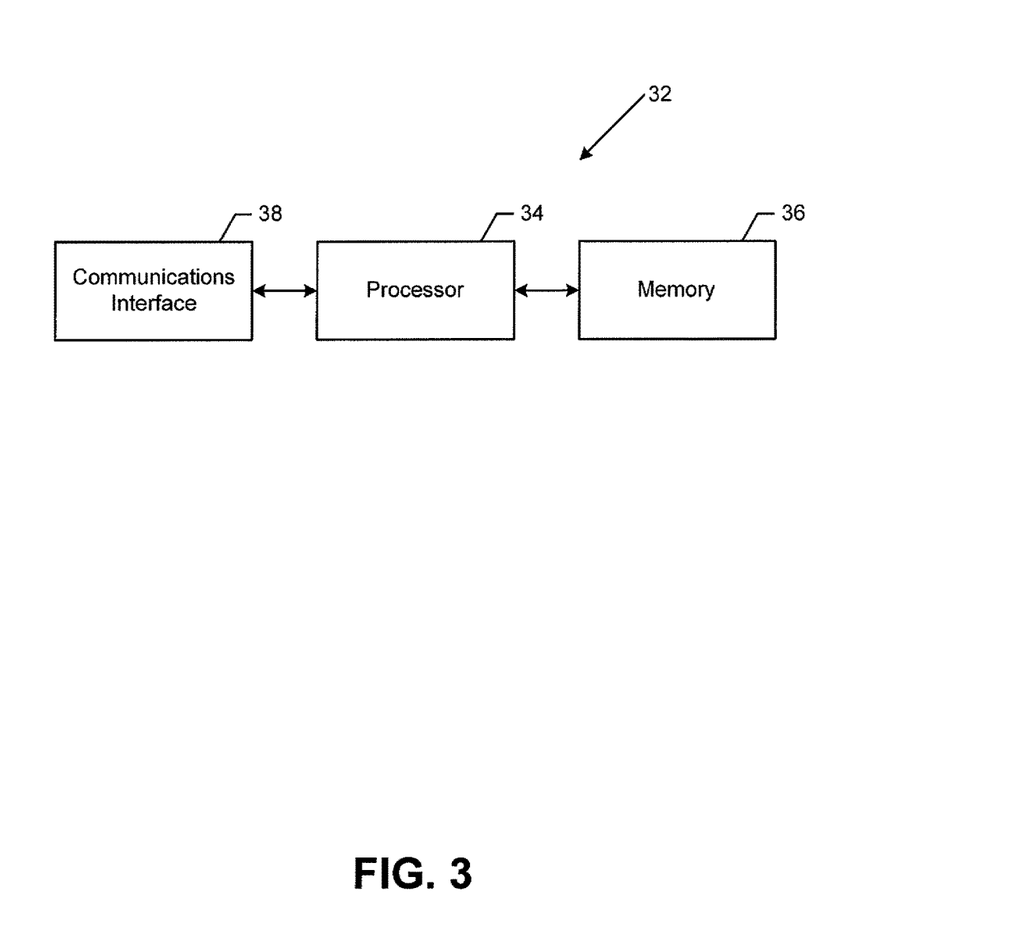
FIG. 3 is a block diagram of an apparatus from the perspective of a network entity, such as an access point, that may be specifically configured to perform the operations of an example embodiment of the present invention.

Referring now to FIG. 3, an apparatus 32 that may be embodied by or otherwise associated with a network entity, such as an access point 12, for communicating with a mobile terminal 10 regarding the multiple subscriptions associated with the mobile terminal may include or otherwise be in communication with a processor 34, a memory device 36 and a communication interface 38. In some example embodiments, the processor (and/or co-processors or any other processing circuitry assisting or otherwise associated with the processor) may be in communication with the memory device via a bus for passing information among components of the apparatus. The memory device may include, for example, one or more non-transitory volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 32 may, in some example embodiments, be embodied by a network entity, such as an access point 12 or other computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 34 may be embodied in a number of different ways. For example, the processor may be embodied as one or more of various hardware processing means such as a coprocessor, a microprocessor, a controller, a DSP, a processing element with or without an accompanying DSP, or various other processing circuitry including integrated circuits such as, for example, an ASIC, an FPGA, a MCU, a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 32 is embodied as a network entity, the processor may be embodied by the processor of the network entity, such as the processor of a server or other computing device.

In an example embodiment, the processor 34 may be configured to execute instructions stored in the memory device 36 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a network entity 14) configured to employ an embodiment of the present invention by further configuration of the processor by instructions for performing the algorithms and/or operations described herein. The processor may include, among other things, a clock, an ALU and logic gates configured to support operation of the processor.

Meanwhile, the communication interface 38 may be any means such as a device or circuitry embodied in either hardware or a combination of hardware and software that is configured to receive and/or transmit data from/to a network 14 and/or any other device or module in communication with the apparatus 32. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, DSL, USB or other mechanisms.

Figure 4:
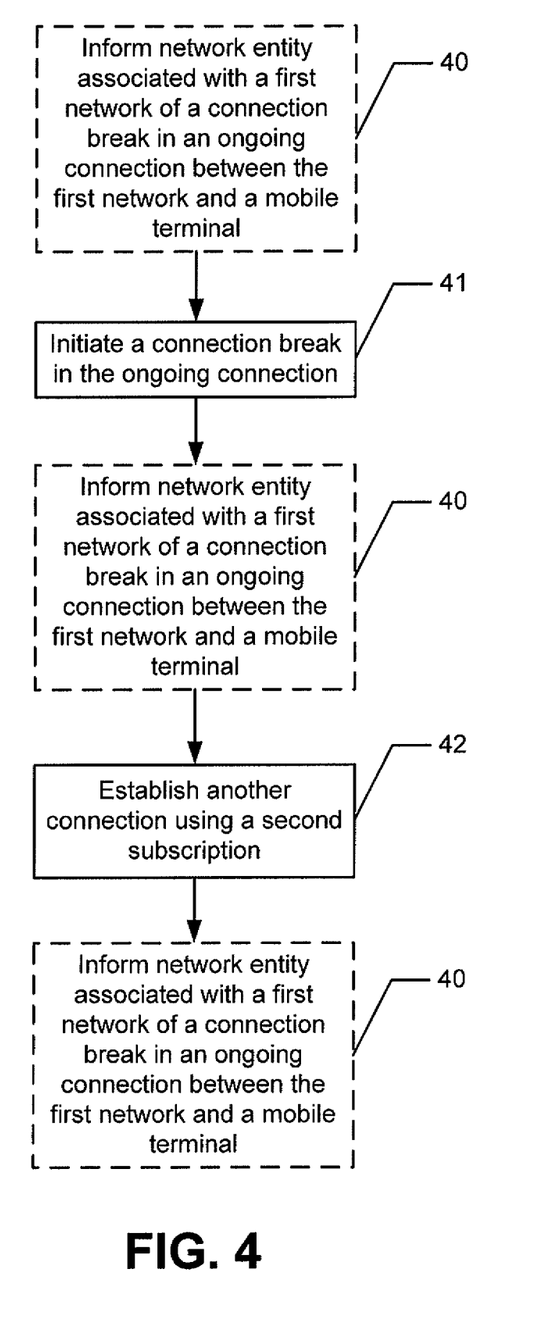
FIG. 4 is a flow chart illustrating the operations performed from the perspective of a mobile terminal in accordance with one embodiment of the present invention.

Referring now to FIG. 4, the operations performed by an apparatus 20 embodied by a mobile terminal 10 are illustrated. As described above in conjunction with FIG. 2, an apparatus embodied by a mobile terminal may include means, such as the processor 22, the communications interface 28 or the like, for causing information to be provided to a network entity, such as an access point 12, regarding a break in an ongoing connection between the mobile terminal and a first network 14. See operation 40 of FIG. 4. The mobile terminal may be associated with a plurality of subscriptions, and may be communicating with the first network 14 via a first subscription of the plurality of subscriptions. For example, in one embodiment the mobile terminal may be communicating with the network 14 via a subscription supported by one of a plurality of SIMs 26 included in the apparatus. As shown in operation 41 of FIG. 4, the apparatus 20 embodied by the mobile terminal may include means, such as the processor, the communication interface or the like, for initiating a connection break in the ongoing connection between the mobile terminal 10 and the first network 14. The apparatus 20 embodied by the mobile terminal 10 may also include means such as the processor 34, the communication interface 38 or the like, for causing another connection to be established with the mobile terminal using a second subscription, as shown in operation 42 of FIG. 4. For example, such as in the multi-SIM embodiment described above, the second subscription may be supported by another one of the plurality of SIMs 26 included in the apparatus. In one embodiment the other connection may, for example, be with a second network 15.

The connection break may, for example, be initiated so that the mobile terminal can perform activities related to multi-subscription operation, such as making or receiving a phone call, reading System Information (SI), performing a cell search, or any other activity, using the second subscription. The connection break may be either temporary or permanent. As indicated by the dotted lines of operation 40, the apparatus 20 may inform the network entity of the connection break either before or after initiating the connection break in the ongoing connection. Thus, the network entity may, for example, be informed of an impending connection break, or receive information about a break that has already occurred. In one embodiment, information regarding the connection break may be provided to the network entity both before and after the connection break. In another embodiment, the network entity may be informed of the connection break after the break takes place, but before the connection to the second network 15 is established.

The information that is provided to the network entity regarding the connection break may include, for example, one or more of the following: a start time of the break; an end time of the break; a duration of the break; a repetition interval of the break (if the break will reoccur periodically); the reason for the break; a request to resume the ongoing connection after the break, such as after completing an activity using another subscription; and/or a request to release the connection. The request to resume the ongoing connection after the break may be appropriate, for example, in situations where the activity related to multi-SIM operation necessitating the connection break is not expected to take a long time. Conversely, the request to release the connection may be appropriate, for example, when the activity related to multi-SIM operation is expected to take a relatively long time, such as on the order of seconds. The request to release the connection may, for example, include a cause value which may indicate the reason for the release request. The information can be provided to the network entity in a variety of different ways. For example, the information may be provided via Medium Access Control (MAC) or Radio Resource Control (RRC) level signaling. Existing MAC Control Elements (CEs) or RRC messages may be used, or may be enhanced to support multi-SIM relevant signaling. For example, in one embodiment the RRC Signaling Connection Release Indication (SCRI) may be enhanced with a new cause value. The cause value may, for example, specifically inform the network entity that the mobile terminal 10 is releasing the connection for multi-SIM activity, such as paging reception, SI reading, or cell searching. In another embodiment, such as an embodiment used in an LTE system utilizing an Evolved UMTS Terrestrial Radio Access Network (E-UTRAN) air interface, information regarding the connection break may be included, for example, in a Measurement Report message. The Measurement Report message may contain, for example, re-negotiated events related to the expected interruption time, such as the expected duration of the connection break. Entirely new signaling messages may alternatively be used to provide the information.

Following the connection break, the mobile terminal 10 may return to the pre-negotiated state and configuration or to a different state and/or configuration. For example, if the mobile terminal 10 was operating in the CELL_DCH state before the connection break, it may return to the CELL_DCH state and use the same configuration as before the connection break. The mobile terminal 10 may alternatively return to the CELL_DCH state, but use a different configuration. The mobile terminal 10 may alternatively, for example, enter a CELL_PCH or CELL_FACH state following the connection break, using predefined configuration parameters. The mobile terminal may alternatively enter an IDLE state after the break. What state and/or configuration the mobile terminal 10 returns to after the connection break may be based, for example, on a timer which determines how long the previously used configuration for the Packet Switched (PS) Radio Access Bearer (RAB) is valid.

Figure 5:
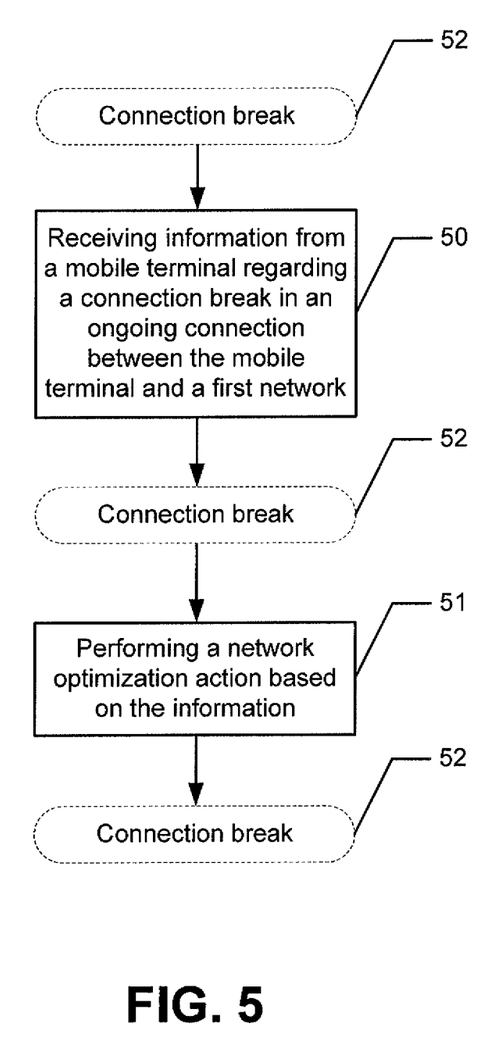
FIG. 5 is a flow chart illustrating the operations performed from the perspective of a network entity, such as an access point, in accordance with one embodiment of the present invention.

Referring now to FIG. 5, the operations performed by an apparatus 32 embodied by or otherwise associated with a network entity, such as an access point 12, are illustrated. As described above in conjunction with FIG. 3, an apparatus embodied by a network entity may include means, such as the processor 34, the communications interface 38 or the like, for receiving information from a mobile terminal regarding a connection break in an ongoing connection between the mobile terminal and a first network 14. See operation 50 of FIG. 5. As shown in operation 51, the apparatus embodied by the network entity may also include means, such as the processor, the communication interface or the like, for performing a network optimization action based on the received information. Possible network optimization actions include, for example: scheduling the mobile terminal; not scheduling the mobile terminal during the connection break; scheduling at least one other mobile terminal during the connection break; either releasing the ongoing connection and one or more resources associated therewith or keeping the ongoing connection alive; allocating at least one of data transmission gaps, measurement gaps, or discontinuous reception (DRX) cycles to the mobile terminal; and/or adjusting one or more adaptation functions, such as power control or link adaptation. Block 50, represented with dotted lines, indicates possible times when the connection break may occur. As shown, the connection break may take place before or after receiving information regarding the connection break and may even occur after performing the network optimization action based on the information.

Thus, there are many ways in which the information provided by the mobile terminal 10 regarding the connection break may be put to use by the network. For example, if the mobile terminal 10 provides one or more of a start time, end time, duration, and repetition interval of the break, such that the network may determine when the break or breaks (if the break will reoccur periodically) occur, the network may, for example, ensure that the mobile terminal 10 is not scheduled during the break. The network can also schedule other mobile terminals during the connection break or breaks, ensuring an efficient allocation of network resources. If the mobile terminal 10 provides a reason for the break, the network may estimate, based on the reason, how long the break will last and schedule the mobile terminal 10 accordingly. The network may also release the connection, such as when the network estimates that the break will last a relatively long time. In addition, the network could, based on the provided reason for the break, allocate data transmission gaps, measurement gaps, or DRX cycles for the mobile terminal. For example, if the mobile terminal indicates that the reason for initiating a connection break is to perform a particular multi-SIM related activity, the network 14 may allocate data transmission gaps, measurement gaps, or DRX cycles suitable to perform the particular multi-SIM related activity. If the mobile terminal 10 provides a request to resume the ongoing connection following the connection break, the network 14 may determine whether it would be beneficial to keep the connection alive without releasing it and, for example, based on that determination, either release or keep alive the ongoing connection. If the mobile terminal provides a request to release the connection, the network 14 may release the ongoing connection and associated resources, which the network 14 may then, for example, allocate for other mobile terminals.

As described above, FIGS. 4 and 5 illustrate flowcharts of an apparatus, method, and computer program product from the perspective of a mobile terminal 10 and a network entity, respectively, according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a non-transitory memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a non-transitory computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the dashed boxes in FIGS. 4 and 5. Modifications, additions, or amplifications to the operations above may be performed in any order and in any combination.

As described above, a method, apparatus and computer program product are provided so as to provide information to a network entity regarding a break in an ongoing connection between a network 14 and a mobile terminal 10 having multiple SIMs 26. By informing the network of the connection break with the mobile terminal having the multiple SIMs, the network and the mobile terminal may subsequently communicate in an improved fashion as well as in a manner that reduces the impact upon the network and other mobile terminals that is otherwise occasioned by the mobile terminal's support of the multiple SIMs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    transmitting, by a mobile terminal and to an access point, information regarding a connection break in an ongoing connection between the mobile terminal and a first network, the access point associated with the first network, the mobile terminal associated with a plurality of subscriptions and communicating with the first network via a first subscription of the plurality of subscriptions, wherein the information comprises an indication of a repetition interval of the connection break and an indication of a duration of the connection break;
    causing, at the mobile terminal and after transmitting the information, the connection break in the ongoing connection to be initiated; and
    causing, at the mobile terminal and after the connection break is initiated, another connection to be established with the mobile terminal using a second subscription of the plurality of subscriptions.

2. The method of claim 1, wherein the information further comprises an indication of at least one of a start time of the connection break or an end time of the connection break.

3. The method of claim 1, wherein the information comprises a reason for the connection break.

4. The method of claim 1, wherein the information comprises a request to either resume the ongoing connection following the connection break or release the ongoing connection.

5. The method of claim 1, further comprising:
    performing, by the mobile terminal, an activity related to multiple subscription operation on the another connection using the second subscription.

6. The method of claim 1, wherein the information comprises a signaling connection release indication.

7. The method of claim 6, wherein the signaling connection release indication comprises a cause value indicating a reason for requesting release of the ongoing connection.

8. The method of claim 1, wherein causing the another connection to be established with the mobile terminal comprises establishing the another connection with a second network.

9. The method of claim 1, wherein the mobile terminal includes a dual subscriber identity module configured to include the first subscription and the second subscription.

10. An apparatus comprising at least one processor and at least one memory storing program code instructions therein, the memory and program code instructions being configured to, with the processor, cause the apparatus to at least:
    transmit, to an access point, information regarding a connection break in an ongoing connection between the apparatus and a first network, the access point associated with the first network, the apparatus associated with a plurality subscriptions and communicating with the first network via a first subscription of the plurality of subscriptions, wherein the information comprises an indication of a repetition interval of the connection break and an indication of a duration of the connection break;

cause, after transmitting the information, the connection break in the ongoing connection to be initiated; and cause, after the connection break is initiated, another connection to be established with the apparatus using a second subscription of the plurality of subscriptions, wherein the apparatus includes a mobile terminal.

11. The apparatus of claim 10, wherein the information further comprises an indication of at least one of a start time of the connection break or an end time of the connection break.

12. The apparatus of claim 10, wherein the information comprises a reason for the connection break.

13. The apparatus of claim 10, wherein the information comprises a request to either resume the ongoing connection following the connection break or release the ongoing connection.

14. The apparatus of claim 10, wherein the apparatus is further caused to at least:

perform an activity related to multiple subscription operation on the another connection using the second subscription.

15. The apparatus of claim 10, wherein the information comprises a signaling connection release indication.

16. The apparatus of claim 15, wherein the signaling connection release indication comprises a cause value indicating a reason for requesting release of the ongoing connection.

17. The apparatus of claim 10, wherein causing the another connection to be established comprises establishing the another connection with a second network.

18. An apparatus comprising a processor and a memory storing program code instructions therein, the memory and program code instructions being configured to, with the processor, cause the apparatus to at least:

receive, from a mobile terminal, information regarding a connection break in an ongoing connection between the mobile terminal and a first network, the apparatus associated with the first network, the mobile terminal associated with a plurality of subscriptions and communicating with the first network via a subscription of the plurality of subscriptions, wherein the information comprises an indication of a repetition interval of the connection break and an indication of a duration of the connection break; and based on the information, perform one or more network optimization actions, wherein the apparatus comprises an access point.

19. The apparatus of claim 18, wherein the information further comprises an indication of at least one of a start time of the connection break or an end time of the connection break.

20. The apparatus of claim 18, wherein the information comprises a reason for the connection break.

21. The apparatus of claim 18, wherein the information comprises a request to either resume the ongoing connection following the connection break or release the ongoing connection.

* * * * *